US006530270B1

(12) United States Patent
Cheng

(10) Patent No.: US 6,530,270 B1
(45) Date of Patent: Mar. 11, 2003

(54) METHOD AND APPARATUS FOR ANALYZING A DRIVETRAIN ASSEMBLY

(75) Inventor: Ming-Te Cheng, Ann Arbor, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,936

(22) Filed: Nov. 1, 2001

(51) Int. Cl.[7] ............................................. G01M 15/00
(52) U.S. Cl. ....................................... 73/118.1; 701/29
(58) Field of Search .............................. 73/116, 117.2, 73/117.3, 118.1; 701/29

(56) References Cited

U.S. PATENT DOCUMENTS

| 4,283,957 A | * | 8/1981 | Zobrist et al. ................. 73/814 |
| 5,771,482 A | * | 6/1998 | Rizzoni .................. 123/406.23 |
| 5,955,674 A | * | 9/1999 | McGovern et al. .......... 701/111 |
| 6,128,959 A | * | 10/2000 | McGovern et al. ............ 73/460 |
| 6,299,540 B1 | * | 10/2001 | Ament .................. 192/213.12 |
| 6,314,342 B1 | * | 11/2001 | Kramer et al. .............. 180/197 |

OTHER PUBLICATIONS

"Modal Testing: Theory and Practice" (book); Author: D.J. Ewans: ISBN 0 86380 017 3 (Wiley Inc. 0 471 90472 4); Research Studies Press Ltd., Taunton, Somerset, England 1984.

* cited by examiner

Primary Examiner—Eric S. McCall
(74) Attorney, Agent, or Firm—F. G. McKenzie

(57) ABSTRACT

A method and an apparatus 10 for discerning the torsional mode response of a portion of a vehicle 12, such as but not limited to a drivetrain assembly, comprising a driveshaft 52, transmission assembly 50, and shaft 14, by the use of signals generated from a dynamometer 72 and pseudo-randomly varying signals which are specified by a pseudorandom waveform generator 94 and which are modified by a previously calculated error signal.

18 Claims, 2 Drawing Sheets

METHOD AND APPARATUS FOR ANALYZING A DRIVETRAIN ASSEMBLY

BACKGROUND OF INVENTION (1) Field of the Invention

The present invention generally relates to a method and an apparatus for analyzing a drivetrain assembly and more particularly, to a method and an apparatus for accurately communicating desired types of signals to the drivetrain assembly which may be used to conduct a torsional modal analysis of the drivetrain assembly.

(2) Background of the Invention

It is desirable to determine the torsional modes of a drivetrain assembly in order to determine the manner in which the drivetrain assembly operates or behaves in actual operation and to evaluate various drivetrain design configurations. Particularly, in such an analysis, several pseudo-randomly generated signals of a certain pseudo-randomly generated frequency and a substantially similar amplitude are generated and communicated to the drivetrain assembly, and the torsional behavior of the drivetrain assembly, upon receipt of these signals, is noted and analyzed. Particularly, certain torsional characteristics or attributes of the drivetrain assembly, for certain signal frequencies, are noted and these torsional characteristics, such as damping, cooperatively form a torsional modal signature for the drivetrain assembly which allows a designer to discern certain operating attributes or characteristics of the drivetrain assembly.

While the foregoing strategy does allow some torsional modal analysis to be made of the drivetrain assembly, it suffers from some drawbacks. For example, the characteristics of the signals (e.g., the frequency and/or the amplitude of the signals) change as the signals are communicated to the drivetrain assembly due to resonance or other dynamic type attributes of the member/apparatus which couples the signals to the drivetrain assembly, thereby causing the analysis to become errant since the observed drivetrain behavior is not the result of the signal frequency and amplitude which was originally generated or desired/programmed, but is the result of a signal having a new and often unknown frequency and amplitude. The amount of such error is often unknown and may cause a drivetrain assembly to be produced having undesired and relatively unknown behavioral characteristics. The present invention overcomes these drawbacks in a new and novel manner and allows the behavior of a drivetrain assembly to be accurately determined.

SUMMARY OF INVENTION

It is a first non-limiting advantage of the present invention to provide a method and an apparatus for analyzing a drivetrain assembly which overcomes some or all of the previously delineated drawbacks associated with prior methods and apparatuses.

It is a second non-limiting advantage of the present invention to provide a method and an apparatus for analyzing a drivetrain assembly which overcomes some or all of the previously delineated drawbacks associated with prior methods and apparatuses and which, by way of example and without limitation, allows a torsional modal analysis to be accurately and efficiently made of a drivetrain assembly.

It is third non-limiting advantage of the present invention to provide a method and an apparatus for analyzing a drivetrain assembly which overcomes some or all of the previously delineated drawbacks associated with prior methods and apparatuses and which, by way of example and without limitation, uses an error feedback strategy to increase the accuracy of the overall analysis.

According to a first non-limiting aspect of the present invention, an assembly for testing a certain apparatus is provided. The assembly comprises a first apparatus which generates at least one signal by use of a certain error measurement and which communicates the at least one signal to the certain apparatus; and a second apparatus which is coupled to the certain apparatus and which measures a certain attribute of the certain apparatus after the at least one signal has been communicated to the current apparatus.

According to a second non-limiting aspect of the present invention, an assembly for conducting a torsional mode analysis upon a portion of a vehicle is provided. The assembly comprises a generator assembly which selectively and pseudo-randomly generates a first signal and which generates a second signal by use of a certain error measurement; an excitor assembly coupled to the portion of the vehicle, which receives the first signal, which uses the received first signal to generate a third signal, and which communicates the third signal to the portion of the vehicle to excite the portion of said vehicle, wherein, the excitor assembly creates said error measurement by use of said first and third signals, the excitor assembly further receiving the second signal, using the second signal in combination with the error measurement to produce a fourth signal, and communicating the fourth signal to the portion of the vehicle to excite the portion of the vehicle; and a torsional mode analysis apparatus which is coupled to the portion of said vehicle and which identifies a torsional mode of the portion of the vehicle as the portion of the vehicle is excited by the third and fourth signals.

According to a third non-limiting aspect of the present invention, a method for determining the behavior of a drivetrain is provided. The method comprises the steps of: generating a first signal; using the first signal to generate a second signal; exciting the drivetrain by the use of the second signal; measuring a certain attribute of the drivetrain as the drivetrain is excited by the second signal; creating an error value by use of the first and second signals; using the error value to generate a third signal; using the third signal to generate a fourth signal; exciting the drivetrain by use of the fourth signal; and measuring the certain attribute of the drivetrain as the drivetrain is excited by the fourth signal.

These and other features, aspects, and advantages of the present invention will become apparent from a reading of the following detailed description of the preferred embodiment invention and by reference to the following drawings.

DETAILED DESCRIPTION

Figure 1:
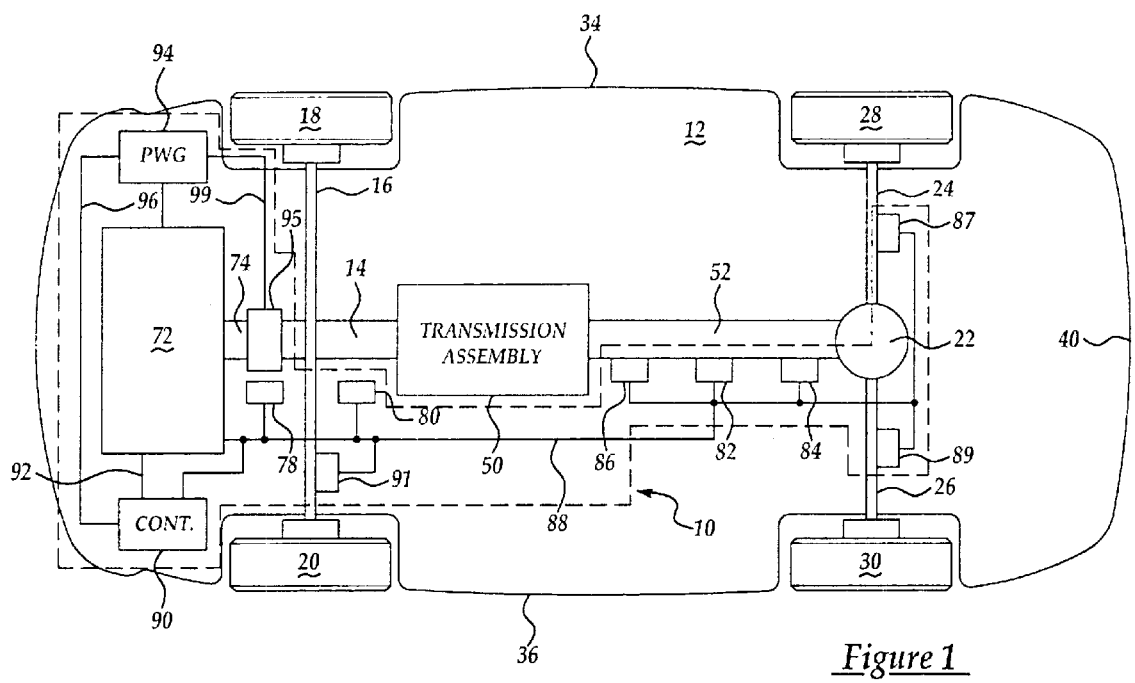
FIG. 1 is a block diagram of an apparatus which is made in accordance with the teachings of the preferred embodiment of the invention in operative combination with a vehicle.

Referring now to FIG. 1, there is shown a testing assembly 10 which is made in accordance with the teachings of the preferred embodiment of the invention in operative combination with a vehicle 12, of the type having a drivetrain assembly whose performance, attributes, and/or behavior is to be analyzed.

Particularly, vehicle 12 includes a first or front axle 16, a first pair of wheels 18, 20 which are coupled to opposite ends of the first axle 16, a differential assembly 22, a pair of rear axle half-shafts 24, 26 which are operatively received by the differential assembly 22, and a second pair of wheels 28, 30 which are respectively and operatively coupled to the half-shafts 24, 26. Vehicle 12 further includes frame members 34, 36 which respectively receive half-shafts 24, 26 and which also receive axle 16. The frame members 34, 36 are coupled by at least one member 40.

Moreover, vehicle 12 includes a transmission assembly 50 and a driveshaft 52 which is coupled to the differential assembly 22 and to the transmission assembly 50. Vehicle 12 normally includes a torque generator, such as an internal combustion engine (not shown) which selectively generates torque which is communicated to the transmission assembly 50. In the preferred embodiment of the invention, the torque is communicated to the transmission assembly 50 by the output shaft or member 14, as is discussed below. The communicated torque is transferred to the differential assembly 22, by the driveshaft 52, and the differential assembly 22 communicates the received torque to the half-shafts 24, 26, effective to rotate the wheels 28, 30. Conventionally, such torque allows the vehicle 12 to be propelled and maneuvered. It should be appreciated that while the vehicle 12 has a certain configuration (e.g., a rear wheel drive configuration), nothing in this description should be construed to limit the application of the invention to a particular type of vehicle. For example in other vehicular configurations the torque may be transferred to the front axle 16. Further, it should be apparent that only the relevant portion of the vehicle 12 are shown in FIG. 1.

As shown, a testing assembly 10 which is made in accordance with the teachings of the preferred embodiment of the invention may be used to determine the torsional modes of the driveshaft 52 (and other selected portions of the vehicle 12) according to the methodology of the preferred embodiment of the invention. That is, as is more fully set forth further below, such torsional modes may also be identified for the combination of the driveshaft 52, the transmission assembly 50, and the output shaft 14, which is referred to as a drivetrain assembly.

As shown, testing assembly 10 includes a programmable torque generator, such as a dynamometer 72 which is adapted to selectively generate torsional type torque having a substantially constant frequency and amplitude, a pseudo-random signal or waveform generator 94 which is adapted to generate or specify a type of torque signal having a certain amplitude and frequency, and an exciter 95, such as a model 814 spinning torsional assembly which is provided by the MTS corporation of Minneapolis, Minn. which receives the signals generated by the dynamometer 72 and specified the generator 94 and which generates a specified pseudo-random signal. Assembly 10 also includes a shaft 74 which operationally simulates a crankshaft and which is coupled to the exciter 95, and a controller 90, operating under stored program control which is coupled to the generator 94, by bus 96, and to the dynamometer 72 by bus 92. The generator 94 is coupled to the exciter 95 by bus 99. In the preferred embodiment of the invention, assembly 94 may specify frequencies from about 25 Hz to about 900 Hz and varying amplitudes and exciter 95 may cause signals, having frequencies within this range and the specified amplitude, to be generated.

Particularly, exciter 95 receives, through shaft 74, a signal emanating from the dynamometer 72 and causes this received signal along with the signal specified by the generator 94 to be communicated to the shaft 14. Shaft 14 couples the received torque or torsional signals to the transmission assembly 50, thereby simulating an engine or other conventional torque generator and being adapted to generate a selected amount and type of torque. The assembly 10 further includes several substantially identical vibration sensors 78, 80, 82, 84, 86, 87, 89, and 91 which are each coupled to the controller 90 by the bus 88, or to a different controller (not shown) which may comprise a date acquisition assembly.

It should be realized that the type, amount, and placement of sensors 78–91 may vary from that which is shown in FIG. 1 and that various types of controllable torque generators may be used in addition to or in place of the dynamometer 72. Particularly, the sensors 78–91 are placed upon or in close proximity to the portion(s) of the vehicle 12 for which a modal analysis is desired to be performed (e.g., the driveshaft 52, the half-shafts 24, 26, the front axle 16, the transmission assembly 50, and the shaft 14). Thus, an analysis may be made of the drivetrain assembly in addition to other portions of the vehicle 12 (the combination of the drivetrain assembly and the other portions of the vehicle 12 which are being analyzed may be referred to as the analyzed portions). As should be apparent, a sensor 78–91 is adapted to measure the vibrations from a member/apparatus to which it is mounted or to which it is deployed in close proximity to. Further, in a non-limiting embodiment, the controller 90 and generator 94 may comprise a single controller.

In operation, as is best set forth below with respect to flowchart or methodology 100 of FIG. 2, the controller 90 causes a pseudo-random waveform or signal to be generated by the generator 94 and communicated to the exciter 95 by use of bus 99. The exciter 95 then attempts to generate the received and specified signal and communicates this signal, in addition to the substantially constant signal emanating from the dynamometer 72, to the shaft or member 14. The sensors 78–91 detect the behavior of the analyzed portions caused by the input signal and this information is provided to the controller 90, by the use of bus 88, in order to allow the information to be used within a torsional mode analysis. Moreover, the sensor 78 and/or the sensor 80, allow the exciter 95 or controller 90 to determine the difference or error between the signal generated by the exciter 95 and the pseudo-random signal actually input to the transmission 50 by the shaft 14. The error is then used to modify the next signal which is specified by the generator 94 and output from the exciter 95. The operation of the assembly 10 will now be explained in greater detail.

Figure 2:
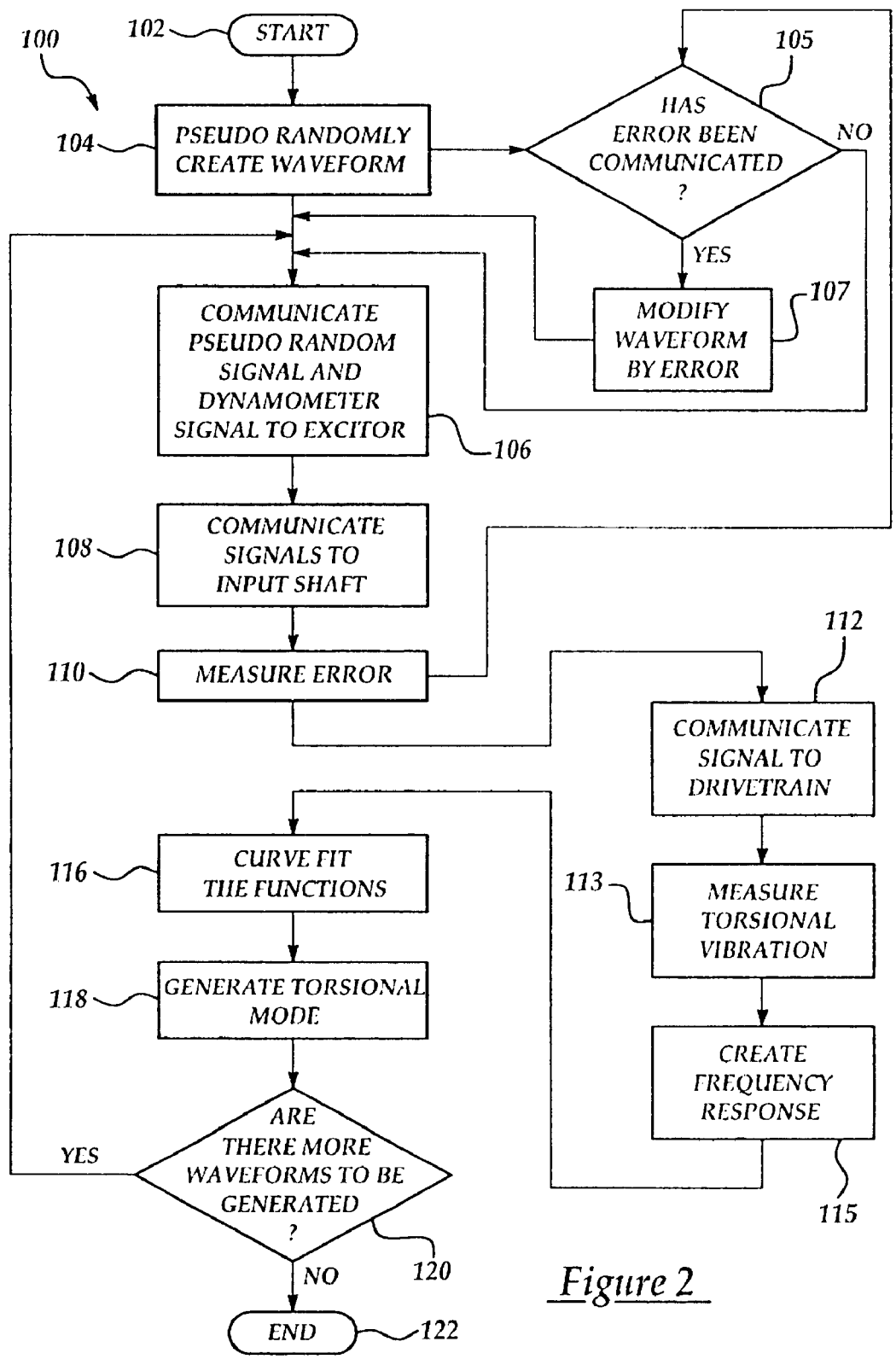
FIG. 2 is a flowchart having a sequence of steps which cooperatively comprise the methodology of the preferred embodiment of the invention.

Referring now to FIG. 2, there is shown a flowchart or methodology 100 of the preferred embodiment of the invention. As shown, methodology 100 begins with an initial step 102 in which the assembly 10 is activated (e.g., the assembly 10 is coupled to the vehicle 12 in the manner shown in FIG. 1 and electrical power is provided to the torque generator or dynamometer 72, to the controller 90, to the pseudo-random waveform or signal generator 94, and to the exciter 95). Further, in step 102, the frequency and amplitude of the signal emanating from the dynamometer 72 is specified. Step 102 is followed by step 104 in which the controller 90 generates and transmits a command signal to the generator 94 which causes the generator 94 to pseudo-randomly define and/or generate a signal to the exciter 95, by bus 99. Step 105 follows step 104 and, in this step 105, the controller 90 determines whether any error signals have been recently communicated to it (e.g., whether any error signals have been communicated to it from the last or most recent operation of step 110 which is explained below). If no such error signal has been recently received by the controller 90, step 106 follows step 105 in which the specified pseudo-random signal is communicated to the excitor 95 along with the signal emanating from the dynamometer 72. Alternatively, step 105 is followed by step 107 in which the specified signal/waveform, most recently received from generator 94, is modified, within the excitor 95, by the amount of the calculated error. The error is more particularly defined with reference to step 110. Step 107 is followed by step 106. Step 108 follows step 106 and in this step 108, the excitor 95 communicates the signals to the member 14.

Step 108 is followed by step 110. Particularly, in step 110, the difference in the frequency of the signal created or specified by the assembly 94 and the frequency of the alternating portion (e.g., the portion specified by generator 94) of the signal actually communicated to the transmission 50 by the shaft 14 is measured and noted by the sensors 78 and/or 80 which may be coupled to the input shaft 14 or respectively to the excitor 95 and the shaft 14. The difference between the amplitude of the signal created or specified by the assembly 94 and the amplitude of the alternating portion of the signal actually communicated to the transmission 50 is also measured and noted by the sensors 78, 80. The differences of frequency and amplitude cooperatively comprise an error signal.

Importantly, in the most preferred embodiment of the invention, the amplitude of the signal which is specified by generator 94 is subtracted from the amplitude of the signal measured by the sensor 78 and/or 80 and the mathematical sign of the resultant value is reversed, thereby forming a first error value. The frequency value of the signal specified by the generator 94 is then subtracted from the frequency value of the signal measured by the sensor 78 and/or 80 and the mathematical sign of the resultant value is reversed, thereby forming a second error value. In the previously discussed step 107, the first error value is added to the amplitude of the newly generated signal which is specified by or which emanates from the generator 94 in the next occurrence of step 104 and the second error value is added to the frequency of the newly generated signal which emanates from and is specified by the generator 94 in the next occurrence of step 104. Step 110 is allowed by steps 105 and 112.

In step 112, the signal which is generated by the excitor 95 is communicated to the drivetrain assembly 52 through the transmission assembly 50 and the member 14. Step 113 follows step 112 and, in this step 113, the sensors 78–86 cooperatively measure the vibration of the drivetrain assembly and the other analyzed portions and provide this information to the controller 90. Step 115 follows the step 113 and, in this step 115, a frequency response is created for each of measured vibration information (e.g., for each analyzed portion) in a conventional manner. Step 115 is followed by step 116.

In step 116 the controller creates a curve which fits or substantially passes through and/or contains each of the previously created and respective frequency responses for each analyzed portion, in a conventional manner. Step 118 follows step 116 and, in this step 118, the torsional modes are recognized, for each analyzed portion, by use of each respectively generated and associated curve. The methodology of steps 115, 116, and 118 is described within the text entitled Modal Testing: Theory and Practice, authored by D. J. Ewins, and published by research studies press (ISBN 0863800173) and which is fully and completely incorporated herein by reference, word for word and paragraph for paragraph.

Step 120 follows step 118 and, in this step 120, the controller 90 determines whether any more signals/waveforms are to be generated. If additional signals/waveforms are to be generated, step 120 is followed by step 104. Alternatively, step 120 is followed by step 122 and, in this step 122, the methodology 100 is ended.

It is to be understood that the invention is not limited to the exact construction or method which has been delineated above, but that various changes and modifications may be made without departing from the spirit and the scope of the inventions as are more clearly delineated in the following claims.

What is claimed is:

1. An assembly for analyzing an apparatus, said assembly comprising:
    a controller which is operable under stored program control and which selectively communicates a signal which is indicative of at least one pseudo-random wave form to a signal generator;
    an excitor assembly which is coupled to said apparatus;
    a signal generator which receives said signal from said controller and generates at least one pseudo-random wave form based upon said received controller signal, wherein said signal generator communicates said pseudo-random wave form to said excitor assembly;
    a selectively programmable torque generator which selectively emits a signal having a constant frequency and amplitude, said signal representing a mode of operation, wherein said selectively programmable torque generator communicates said signal to said excitor assembly and in response to said communicated signal and said communicated pseudo-random wave form, said excitor assembly creates a vibration signal and applies said vibration signal to said apparatus; and
    a plurality of sensors which sense at least one attribute of said applied vibration signal and communicate said at least one attribute to said controller, wherein said controller determines a first and a second error based upon said received at least one attribute, said controller creating at least one frequency response signal and a response curve which fits said at least one frequency response signal, said created curve being effective to identify at least one torsional mode of said apparatus, thereby analyzing said apparatus.

2. The assembly of claim 1 wherein said at least one attribute comprise a torsional mode response.

3. The assembly of claim 2 wherein said apparatus comprises a drivetrain assembly.

4. The assembly of claim 3 wherein said signal generator comprises a pseudo-random waveform generator, and wherein said selectively programmable torque generator comprises a dynamometer, said pseudo-random wave form generator being coupled to said dynamometer and to said excitor, said excitor further being coupled to said waveform generator and to said dynamometer.

5. The assembly of claim 4 wherein said at least one vibration signal has a frequency between about 25 Hz to about 900 Hz.

6. An assembly for conducting a torsional mode analysis upon a portion of a vehicle, said assembly comprising:
    a generator assembly which selectively and pseudo-randomly generates a first and a second signal;
    an excitor assembly which is coupled to said portion of said vehicle, which receives said first signal and, based upon said received first signal, said excitor generates a third signal, said excitor assembly communicating said third signal to said portion of said vehicle to vibrate said portion of said vehicle, wherein said excitor assembly further creates an error measurement based upon said first and said third signals, said excitor assembly further receiving said second signal, comparing said second signal to said error measurement to produce a fourth signal, and communicating said fourth signal to said portion of said vehicle to vibrate said portion of said vehicle; and a torsional mode analysis apparatus which is coupled to said portion of said vehicle and which creates a frequency response signal and a response curve which fits said at least one frequency response signal, said created curve being effective to identify at least one torsional mode of said portion of said vehicle as said portion of said vehicle is vibrated by said third and fourth signals.

7. The assembly of claim 6 wherein said first and said fourth signals each have a respective frequency of less than about 900 Hz.

8. The assembly of claim 6 wherein said torsional mode analysis apparatus comprises a sensor assembly which is coupled to said portion of said vehicle; and a controller which is coupled to said sensor assembly.

9. The assembly of claim 8 wherein said portion of said vehicle comprises a drivetrain assembly.

10. The assembly of claim 9 wherein said portion of said vehicle further comprises at least one axle.

11. The assembly of claim 6 wherein said generator assembly comprises a signal generator; and a controller which is coupled to said signal generator.

12. A method for determining behavior of a portion of a vehicle, said method comprising the steps of:

generating a first signal;

generating a second signal based upon said first signal;

vibrating a portion of a vehicle with said second signal;

measuring an attribute of said portion of said vehicle as said portion of said vehicle is vibrated by said second signal;

creating an error value by comparing said first and second signals;

generating a third signal based upon said error value;

generating a fourth signal based upon said third signal;

vibrating said portion of said vehicle with said fourth signal;

measuring said attribute of said portion of said vehicle as said portion of said vehicle is vibrated by said fourth signal; and creating a frequency response signal and a response curve which fits said at least one frequency response signal, said created curve being effective to identify at least one torsional mode of said portion of said vehicle as said portion of said vehicle is vibrated by said fourth signal.

13. The method of claim 12 wherein said step of creating an error value comprises the step of subtracting said first signal from said second signal.

14. The method of claim 12 wherein said portion of said vehicle comprises a drivetrain assembly.

15. The method of claim 14 wherein said portion of said vehicle comprises at least one axle.

16. The method of claim 12 wherein said error value comprises a frequency value.

17. The method of claim 12 wherein said error value comprises an amplitude value.

18. The method of claim 12 wherein said step of measuring said certain attribute comprises the step of measuring an amount of vibration.

\* \* \* \* \*